(12) United States Patent
Echevarria Vallespi (10) Patent No.: US 10,559,116 B2
(45) Date of Patent: Feb. 11, 2020

(54) INTERACTIVE CARICATURE GENERATION FROM A DIGITAL IMAGE

(71) Applicant: Adobe Inc., San Jose, CA (US)

(72) Inventor: Jose Ignacio Echevarria Vallespi, San Jose, CA (US)

(73) Assignee: Adobe Inc., San Jose, CA (US)

( * ) Notice: Subject to any disclaimer, the term of this patent is extended or adjusted under 35 U.S.C. 154(b) by 9 days.

(21) Appl. No.: 15/912,324

(22) Filed: Mar. 5, 2018

(65) Prior Publication Data

US 2019/0272668 A1    Sep. 5, 2019

(51) Int. Cl.
| | |
|---|---|
| *G06T 15/10* | (2011.01) |
| *G06T 15/50* | (2011.01) |
| *G06T 7/73* | (2017.01) |
| *G06K 9/00* | (2006.01) |

(52) U.S. Cl.
CPC .......... *G06T 15/10* (2013.01); *G06K 9/00248* (2013.01); *G06T 7/74* (2017.01); *G06T 15/503* (2013.01)

(58) Field of Classification Search
CPC .............................................. G06T 13/20–40
See application file for complete search history.

(56) References Cited

U.S. PATENT DOCUMENTS

| | | | | |
|---|---|---|---|---|
| 2005/0212821 A1* | 9/2005 | Xu | ........................... | G06T 11/00 345/647 |
| 2009/0132371 A1* | 5/2009 | Strietzel | ................. | G06Q 30/02 705/14.46 |
| 2014/0192045 A1* | 7/2014 | Hwang | .................... | G06T 15/02 345/419 |
| 2015/0287229 A1* | 10/2015 | Sela | ......................... | G06T 13/40 345/419 |
| 2016/0011769 A1* | 1/2016 | Zou | .......................... | G06T 11/00 715/863 |

OTHER PUBLICATIONS

Park, Byung-Hwa, Se-Young Oh, and Ig-Jae Kim. "Caricature Drawing System by Understanding User Facial Attributes." Proceedings of HCI Korea. Hanbit Media, Inc., 2016. (Year: 2016).*

* cited by examiner

*Primary Examiner* — Daniel F Hajnik
(74) *Attorney, Agent, or Firm* — SBMC (57) ABSTRACT

Caricature generation techniques and systems are described that are configured to preserve an individuality identity of a subject of the caricature and thus overcome inaccuracies and failures of conventional techniques. In one example, a caricature generation system is employed by a computing device to determine deviations of facial features of a subject captured by a digital image from reference values. Caricature-specific blend shapes are then employed by the caricature generation system to generate a digital image caricature from a digital image based on these deviations. In one example, blend shapes include interaction rules that define an interplay of distortions that are jointly applied to at least two of the facial features of a subject in the digital image.

19 Claims, 12 Drawing Sheets

Fig. 11

INTERACTIVE CARICATURE GENERATION FROM A DIGITAL IMAGE

BACKGROUND

Caricatures are a popular art form that is created based on exaggerating a person's facial features. Conventional techniques to do so typically require expertise on the part of an artist to exaggerate prominent features of a subject, while retaining an identity of the subject. Although automated techniques have been developed for use by a computing device to generate a caricature, these conventional techniques typically fail to produce desired results.

In one conventional example, distortions applied to facial features are predetermined regardless of the particular facial features of a subject of the caricature. Thus, these distortions result in a loss of an individualized identity of the subject and run counter to the underlying purpose of even generating a caricature. In another conventional example, distortions applied to facial features are applied all at once and are not coordinated with each other. This causes the resulting caricature to have exaggerated features that visually interfere with each other, thereby producing a distorted result that also does not accurately capture an identity of the subject.

SUMMARY

Caricature generation techniques and systems are described that are configured to preserve an individual identity of a subject of the caricature and thus overcome inaccuracies and failures of conventional techniques. In one example, a caricature generation system is employed by a computing device to determine deviations of facial features of a subject captured by a digital image from reference values. This may be used, for instance, by the caricature generation system to determine deviations in eye size, nose length, and so forth from references values, e.g., of "average" facial features.

Caricature-specific blend shapes are then employed by the caricature generation system to generate a digital image caricature from a digital image based on these deviations. The blend shapes define stylized distortions that are usable to generate a caricature that preserves an identity of the subject of the caricature in the digital image. To do so, blend shapes include interaction rules that define an interplay of distortions that are jointly applied to at least two of the facial features of a subject in the digital image. In this way, the identity of a user may be preserved.

A blend shape, for instance, may include an interaction rule that specifies an inverse relationship between eye size and nose size. As a result, as an amount of distortion made to the eye size increases, a corresponding reduction is made to an amount to the nose size. This may be performed automatically and without user intervention by the caricature generation system and/or through user interaction with options in a user interface.

The caricature generation system, for instance, may determine a degree, to which, facial features of a subject of the digital image deviate from reference values for those features. The caricature generation system may then apply blend shapes to the digital image to distort facial features that follow this determined degree of departure, e.g., based on greater to lesser degrees of departure. In this way, identity of a user may be preserved, even across subjects having similar features such as family members. The caricature generation system may also include options that are user selectable via a user interface to initiate and/or further refine application of distortions of the digital image in a guided way such that results remain identity-preserving, e.g., through the use of sliders.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Caricatures are a popular art form that is created based on exaggerating a person's facial features. Conventional techniques to do so typically require expertise on the part of an artist to exaggerate prominent features of a subject, while retaining an identity of the subject. Although automated techniques have been developed for use by a computing device to generate a caricature, these conventional techniques typically fail by having exaggerated features that visually interfere with each other.

Accordingly, caricature generation techniques and systems are described that are configured to generate a caricature in real time that preserve an individuality identity of a subject of the caricature. To do so, the caricature generation system first receives a digital image having a subject of the caricature. A face model (e.g., two dimensional or three dimensional) is then generated by the caricature generation system based on facial features of the subject that are detected from the digital image, e.g., detected using facial recognition and facial landmark detection. The caricature generation system, for instance, may fit the face model based on a position of facial landmarks such as corners of the eyes, nostrils, tip of the nose, and so forth.

A digital image caricature is then generated by the caricature generation system by applying a blend shape to distort the facial features of the face model. The blend shapes define stylized distortions that are usable to generate a caricature that preserves an identity of the subject of the caricature in the digital image.

To do so, blend shapes include interaction rules that define an interplay of distortions that are jointly applied to at least two of the facial features of a subject in the digital image. In this way, the identity of a user may be preserved. A blend shape, for instance, may include an interaction rule that specifies an inverse relationship between eye size and nose size. As a result, as an amount of distortion made to a size of the eye increases, a corresponding reduction is made to a size of the nose. This may be performed automatically and without user intervention by the caricature generation system and/or through user interaction with options in a user interface.

The caricature generation system, for instance, may determine a degree, to which, facial features of a subject of the digital image deviate from reference values for those features and rank those features. The caricature generation system may then apply blend shapes, sequentially, in order for the face model to distort facial features based on this ranking, e.g., from greater to lesser degrees of departure. In this way, identity of a user may be preserved, even across subjects having similar features such as family members.

The caricature generation system may also include options that are user selectable via a user interface to initiate and/or further refine application of distortions of the digital image, e.g., through the use of sliders. For example, as previously described blend shapes may include interaction rules that specify an interplay of at least two distortions. Accordingly, a slider may be used to specify relative amounts of these distortions that are applied to the face model. The distortions may be output in the user interface by the caricature generation system in real time as user inputs are received. Other examples of blend shapes are also contemplated in this example, including use of blend shapes that specify distortions for a single type of facial feature, e.g., head size. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
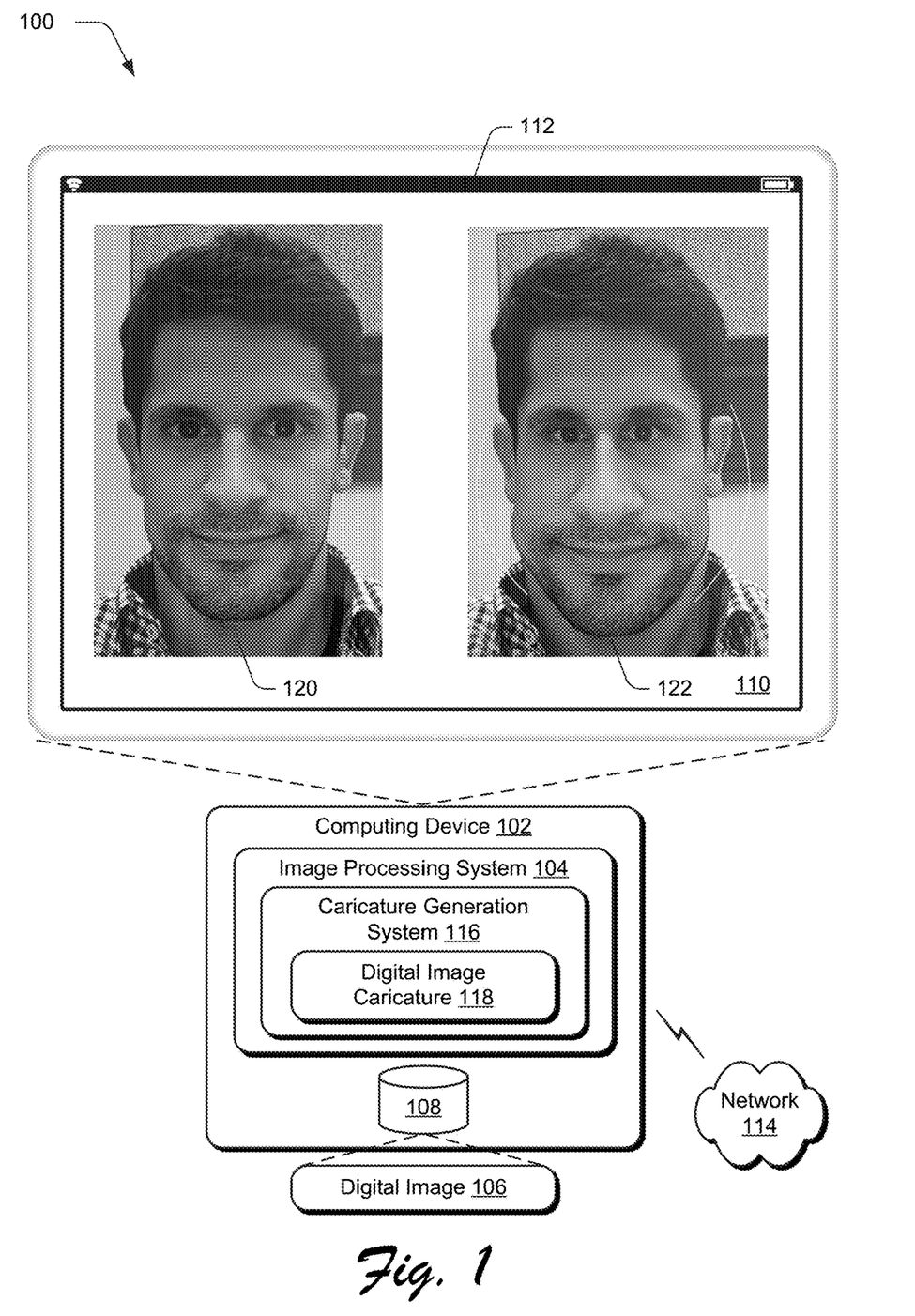
FIG. 1 is an illustration of an environment in an example implementation that is operable to employ digital image caricature techniques described herein.

FIG. 1 is an illustration of a digital medium environment 100 in an example implementation that is operable to employ techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 11.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, editing of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as a caricature generation system 116. The caricature generation system 116 is configured to generate a digital image caricature 118 in real time by distorting a subject's facial features in a digital image 106. Further, this is performed to maintain a user's identity and thus overcomes challenges of conventional techniques and systems.

As previously described, in one conventional example distortions are applied to a digital image all at once, and as a result do not take into account other distortions that are also applied. Consequently, this convention technique often results in features exaggerations that may fight with each other, thereby producing a distorted result that does not capture the identity of the subject. In another conventional example, "canned" distortions are used that are applied in the same way to each subject and thus also result in a lack of identity.

Accordingly, the caricature generation system 116 is configured to overcome the challenges of conventional techniques to generate a digital image caricature 118 in real time that preserves an identity of a subject of the caricature. This may be performed for a variety of types of digital images 106, such as of a single "still" digital image, digital images as part of a digital video, animated virtual puppets, and so forth. As shown in the illustrated example, a digital image may be received that includes a subject's face. The caricature generation system 116 is configured to distort the digital image 120 such that facial features of the subject are exaggerated to form a digital image caricature 122.

In order to preserve identity of the subject such that the subject is readily recognizable as being the basis of the caricature, the caricature generation system 116 may employ a variety of techniques. These techniques include use of blend shapes having interaction rules that define an interplay of distortions made to different facial features, use of a ranked order to apply the blend shapes based on deviations of facial features of a subject from reference values, and so forth. Further discussion of these and other examples is included in the following section.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Caricature Generation System and Techniques

Figure 2:
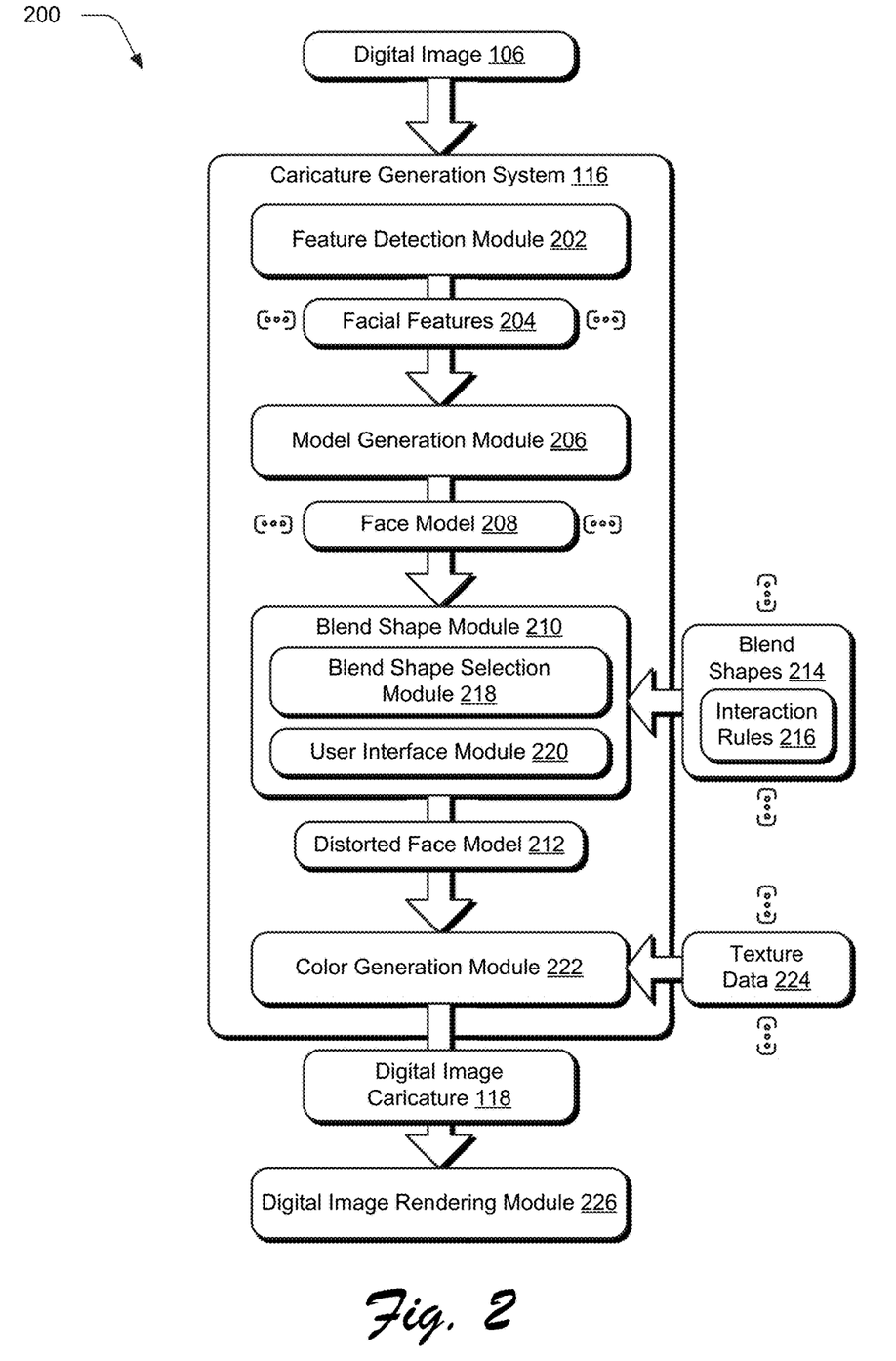
FIG. 2 depicts a system in an example implementation showing operation of a caricature generation system of FIG. 1 in greater detail.
Figure 3:
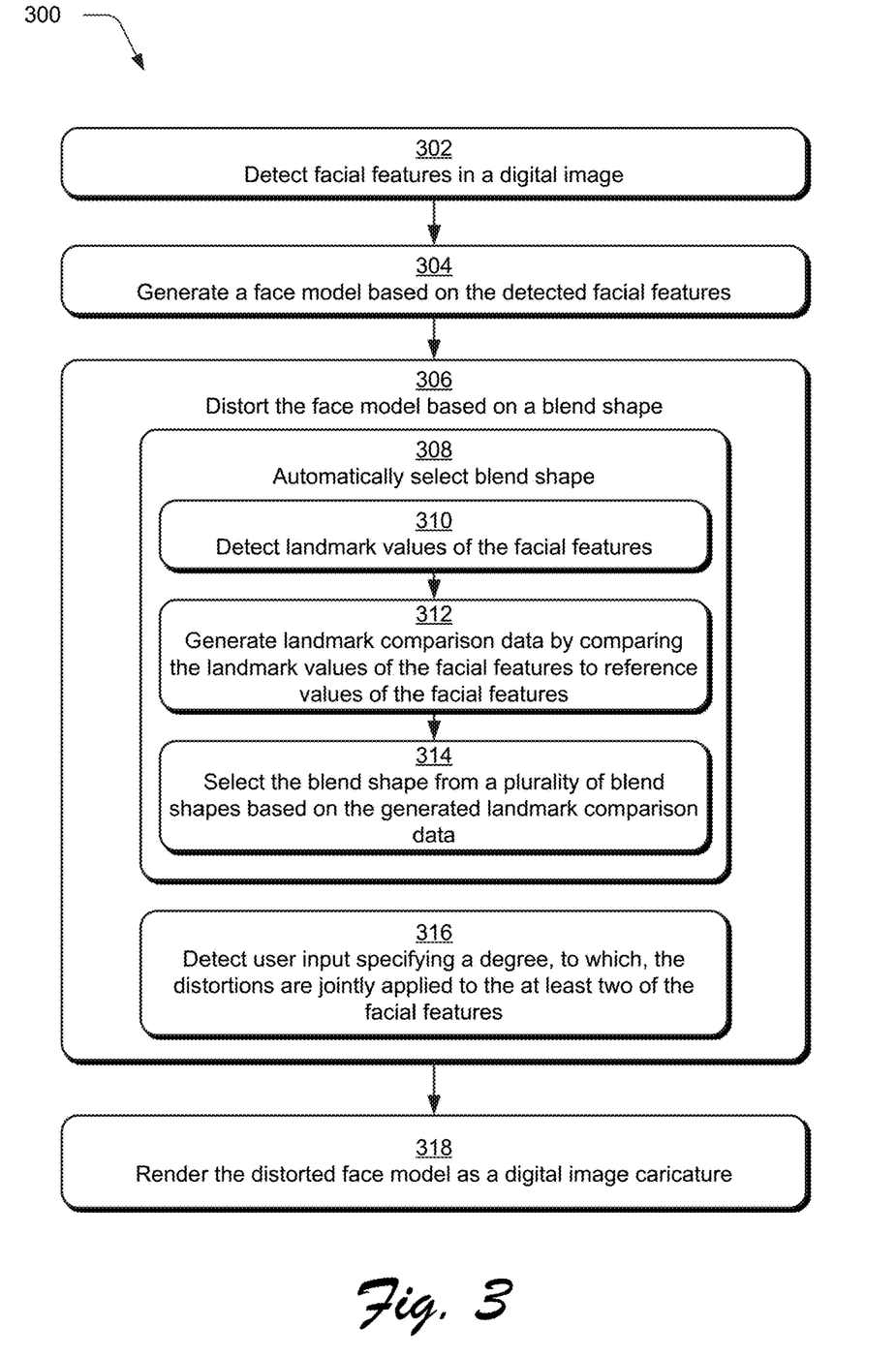
FIG. 3 is a flow diagram depicting a procedure in an example implementation in which a digital image caricature is generated from a digital image.
Figure 4A:
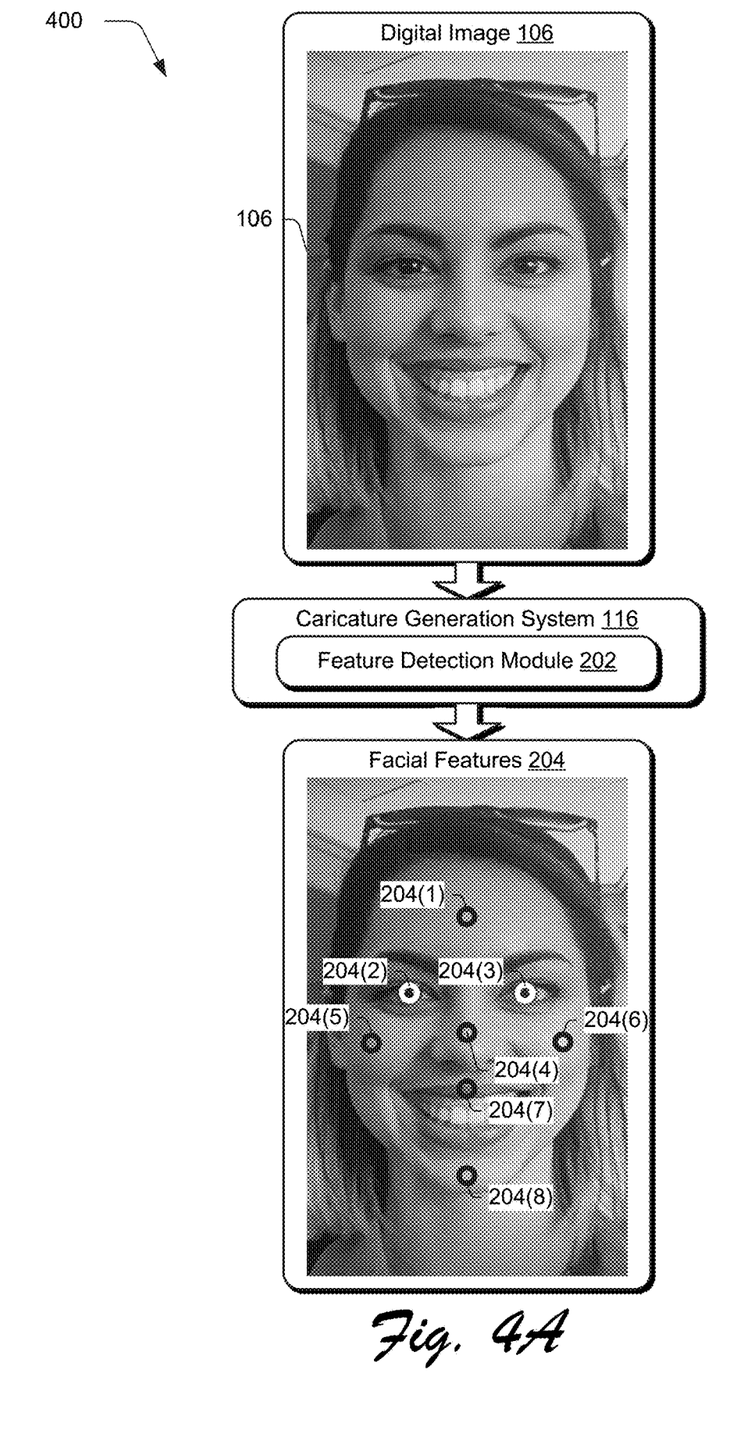
FIGS. 4A and 4B are systems depicting operation of a feature detection module of FIG. 2 in greater detail.
Figure 4B:
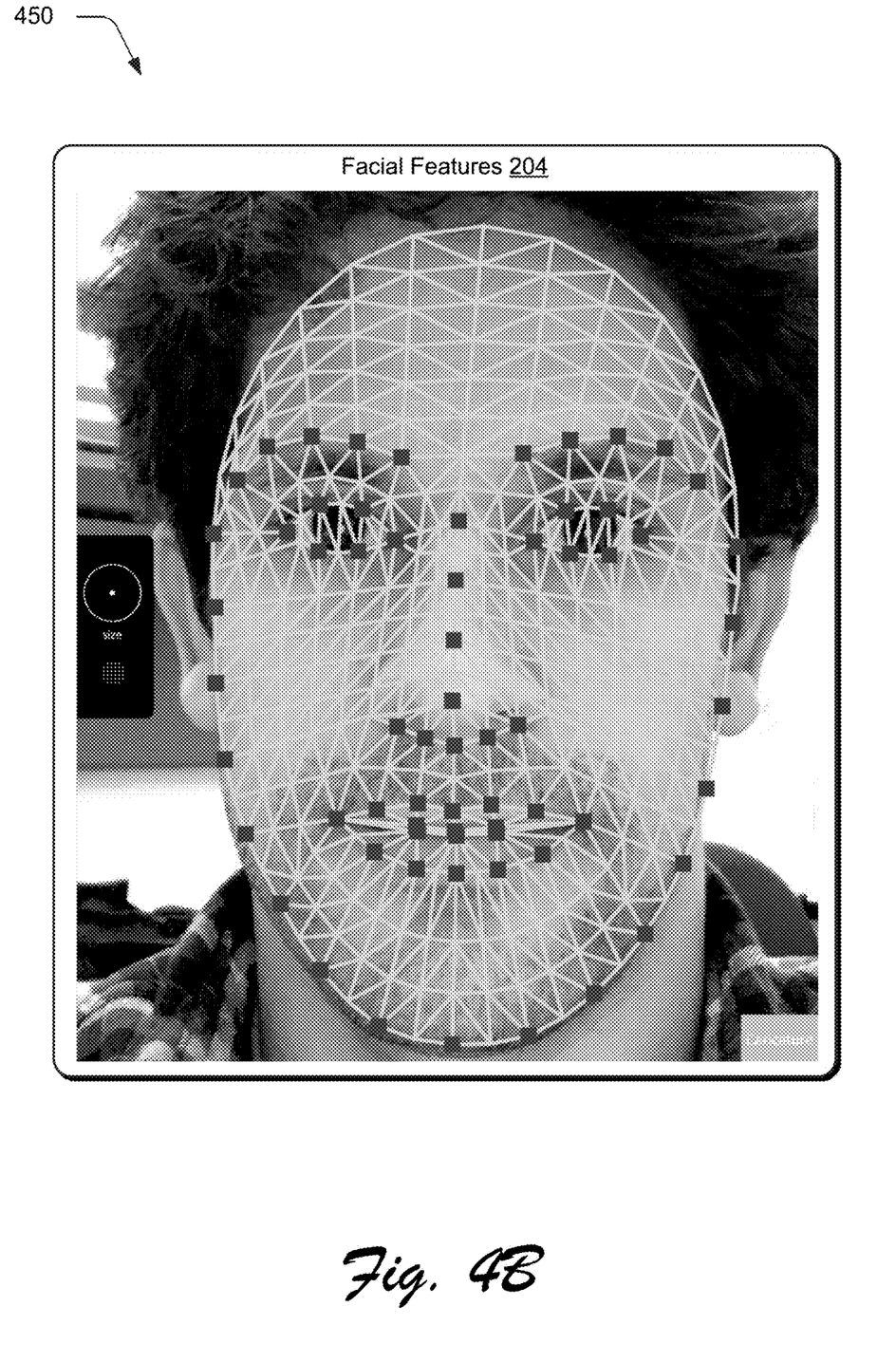
Figure 5:
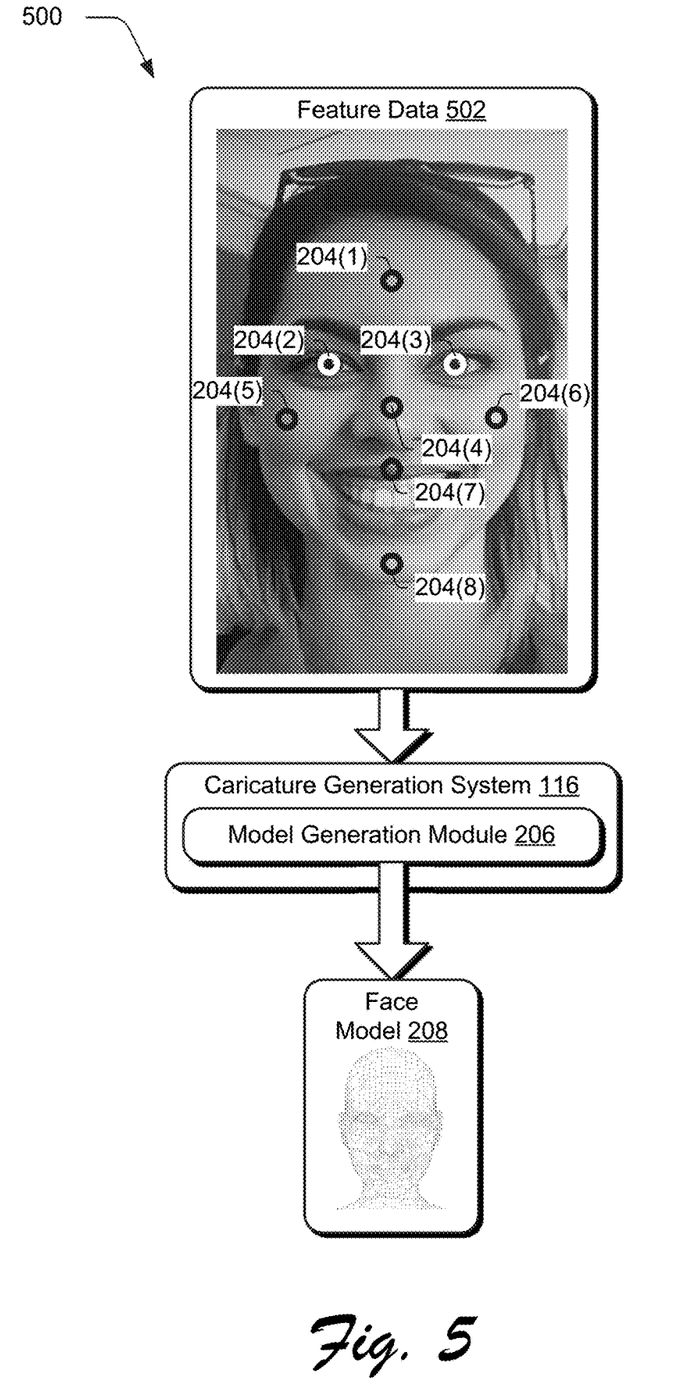
FIG. 5 is a system depicting operation of a model generation module of FIG. 2 in greater detail.
Figure 6:
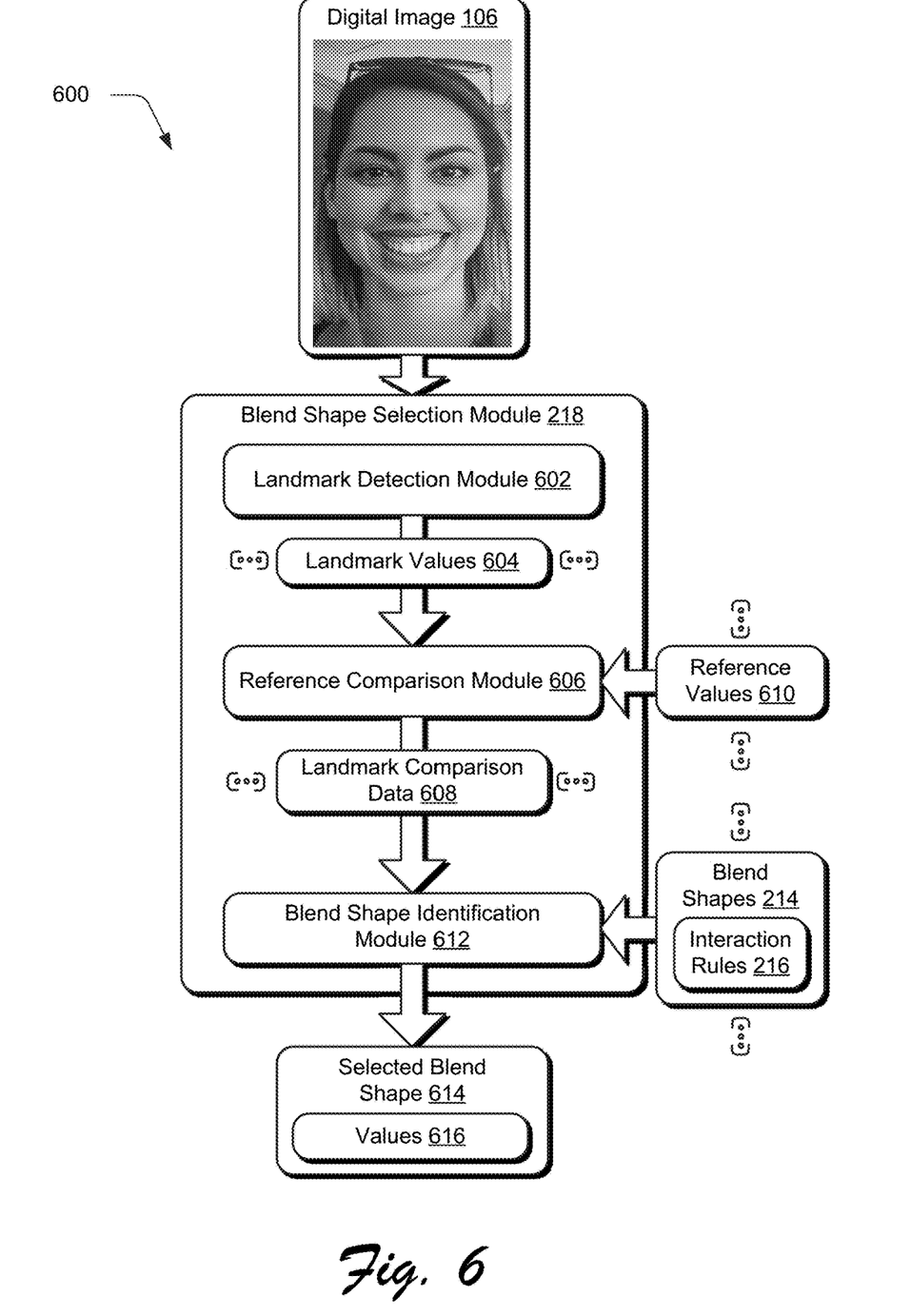
FIG. 6 is a system depicting operation of a blend shape selection module of FIG. 2 in greater detail as generating and applying a blend shape automatically and without user intervention.
Figure 7:
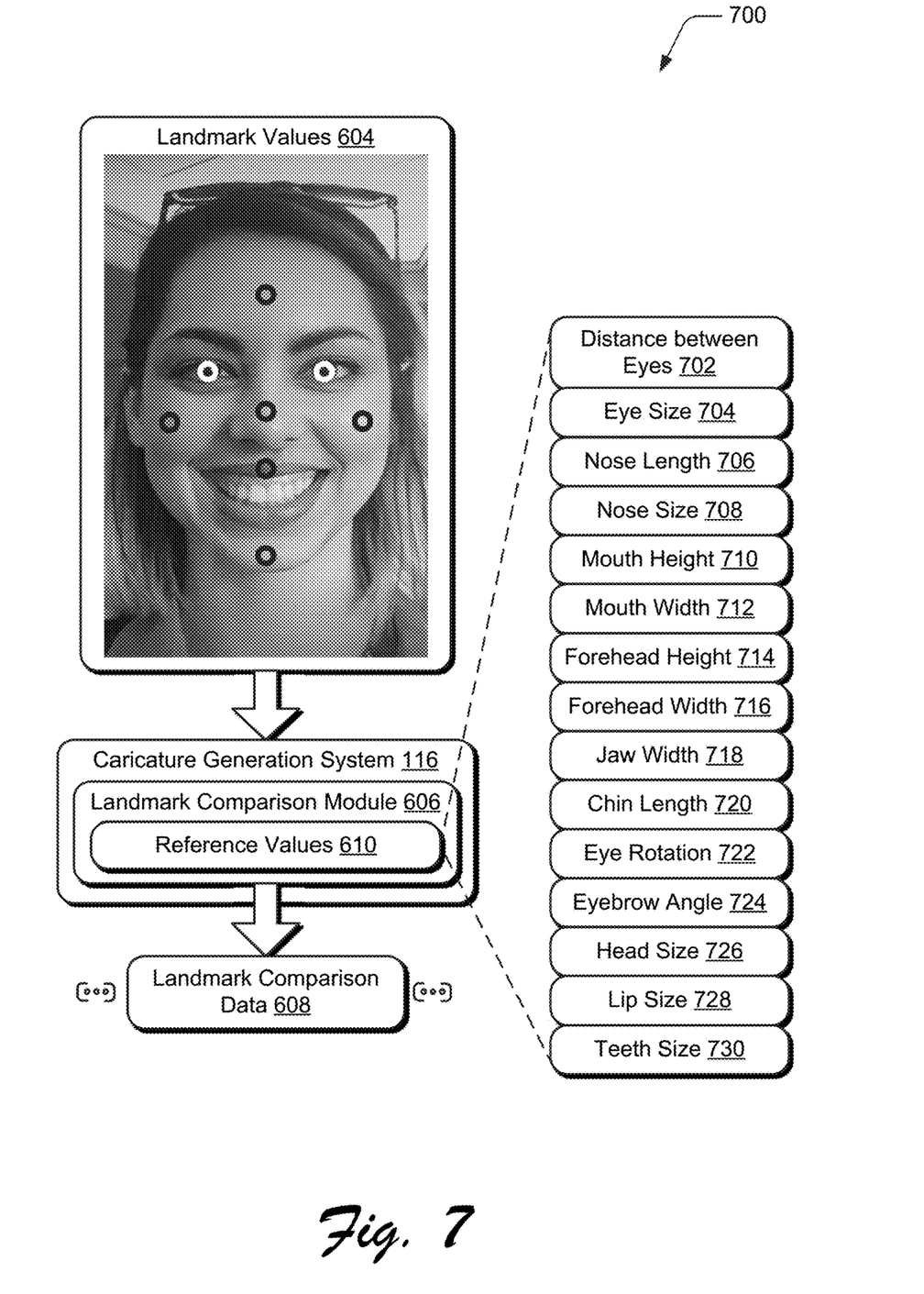
FIG. 7 is a system depicting operation of a landmark comparison module of FIG. 6 in greater detail.
Figure 8:
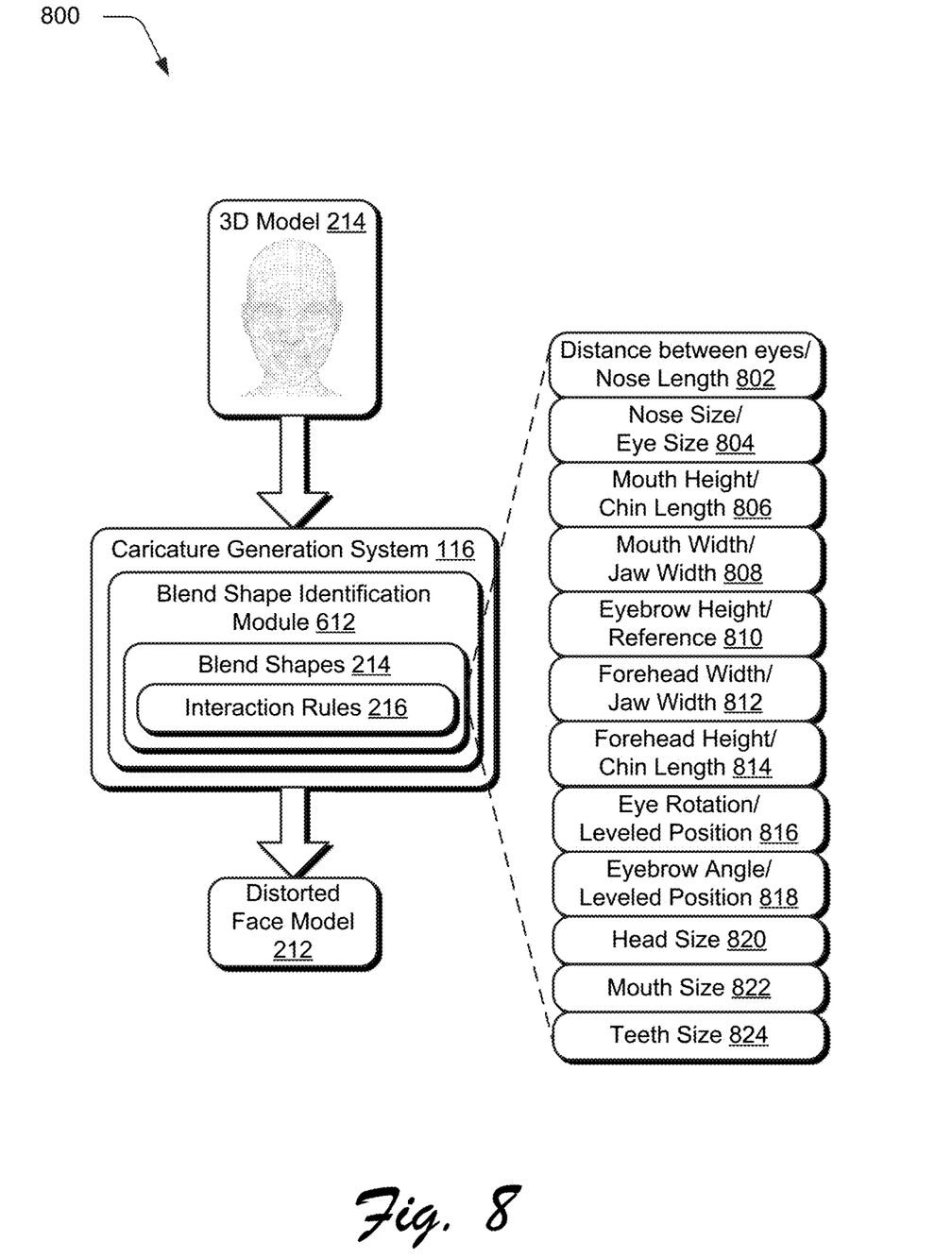
FIG. 8 is a system depicting operation of a blend shape identification module of FIG. 6 in greater detail.
Figure 9:
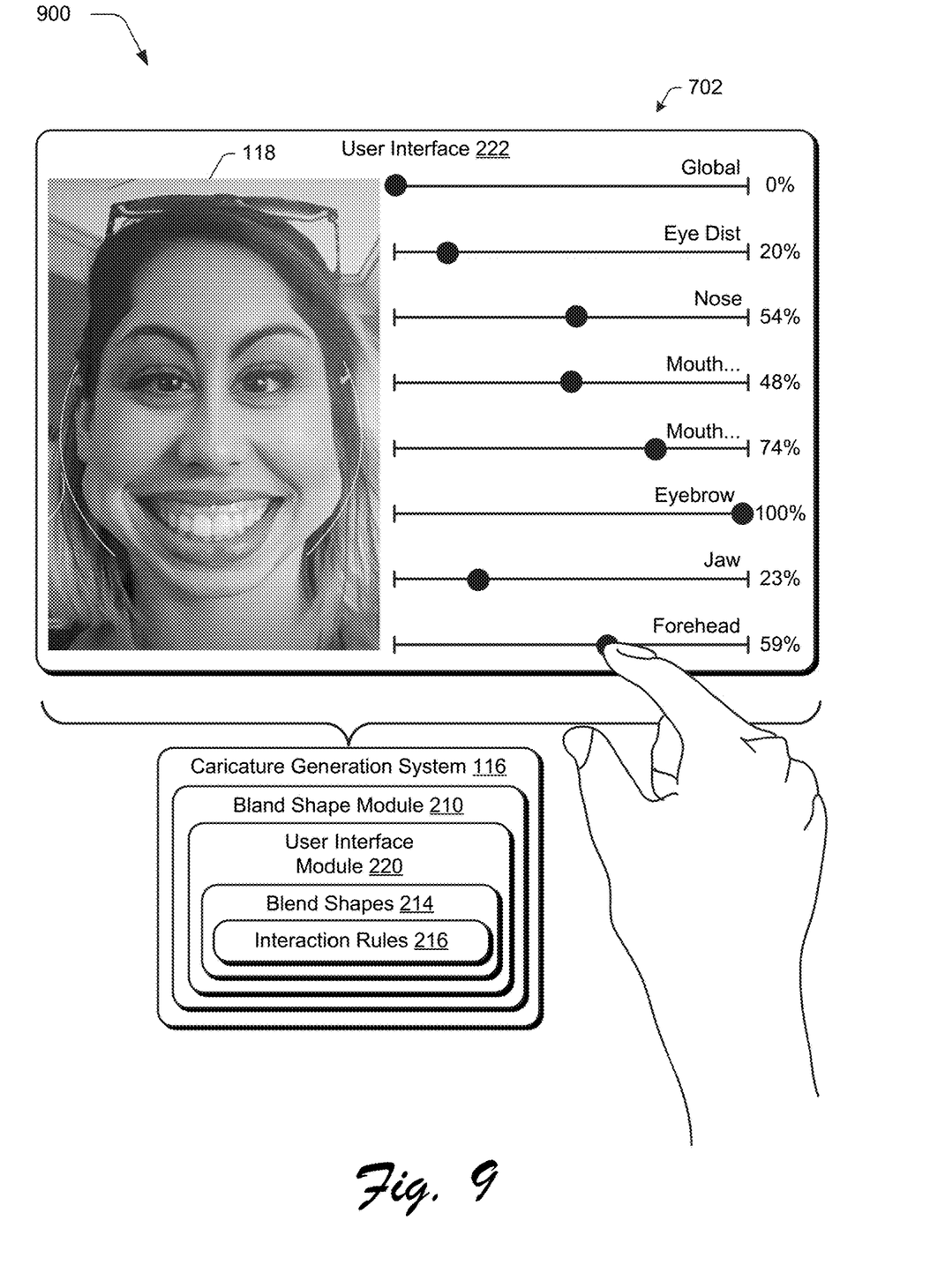
FIG. 9 is a system depicting operation of a user interface module of FIG. 2 in greater detail as supporting user interaction to create and/or refine generation of a digital image caricature.
Figure 10:
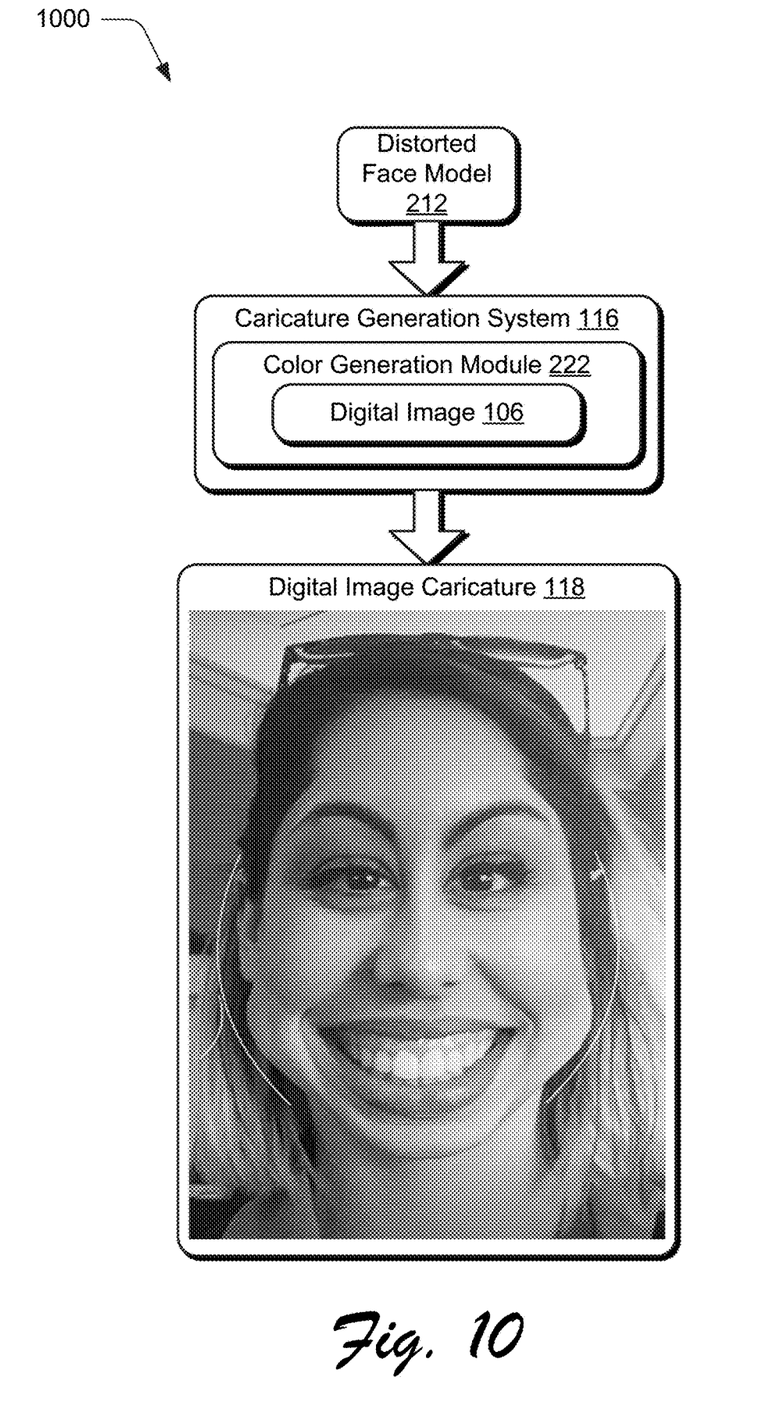
FIG. 10 is a system depicting operation of a color generation module of FIG. 2 in greater detail.

FIG. 2 depicts a system 200 in an example implementation showing operation of the caricature generation system 116 of FIG. 1 in greater detail. FIG. 3 depicts a procedure 300 in an example implementation in which a digital image caricature is generated from a digital image. FIGS. 4A and 4B are systems 400, 450 depicting operation of a feature detection module of FIG. 2 in greater detail. FIG. 5 is a system 500 depicting operation of a model generation module of FIG. 2 in greater detail. FIG. 6 is a system 600 depicting operation of a blend shape selection module of FIG. 2 in greater detail as generating and applying a blend shape automatically and without user intervention. FIG. 7 is a system 700 depicting operation of a landmark comparison module of FIG. 6 in greater detail. FIG. 8 is a system 800 depicting operation of a blend shape identification module of FIG. 6 in greater detail. FIG. 9 is a system 900 depicting operation of a user interface module of FIG. 2 in greater detail as supporting user interaction to create and/or refine generation of a digital image caricature. FIG. 10 is a system 1000 depicting operation of a color generation module of FIG. 2 in greater detail.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made to FIGS. 1-10.

To begin, a digital image 106 is received by the caricature generation system 116. The digital image 106 may take a variety of forms, such as a single "still" digital image, a digital image included in a sequential series of digital images as part of a digital video (e.g., animation or digital movie), and so forth. Additionally, the digital image may capture real and/or virtual subjects, e.g., an animated virtual puppet.

The caricature generation system 116 begins generation of the digital image caricature 118 by processing the digital image 106 using a feature detection module 202 to detect facial features 204 in the digital image 106 (block 302). The feature detection module 202, for instance, may employ object recognition (e.g., using machine learning) to generate facial feature 204 data that describes coordinates of facial features (i.e., facial landmarks) in the digital image 106. This may include facial features including a center of a subject's forehead 204(1), center of the subject's eyes 204(2), 204(3), corners of the eyes, location of a user's nose 204(4), cheek bones 204(5), 204(6), lips 204(7), chin 204(8). This list is not exhaustive and may include other features, such as location of the corners of the user's eyes and teeth as well as sizes of these facial features. Other examples of facial landmarks are illustrated in FIG. 4B.

The detected facial features 204 are then received as an input (e.g., via an API) by a model generation module 206. The model generation module 206 uses this data to generate a face model 208 based on the detected facial features. The model generation module 206, for instance, may generate the face model 208 by adjusting a model based on feature data 502 that describes the facial features, in two or three dimensions. For example, coordinates of the facial features 204(1)-204(8) and distances of the facial features in relation to each other may be used to adjust corresponding points on a three dimensional model of a human head. Another example of facial features detected and used to generate a model in two dimensions is illustrated in FIG. 4B. Other examples of generation of a face model 208 are also contemplated, such as through detection of the facial features using a depth sensor (e.g., a forward facing depth sensor of a mobile phone) which are then fit to a model based on detected facial landmarks.

The face model 208 is then employed by a blend shape module 210 to generate a distorted face model 212 that is used as a basis of the digital image caricature 118. To do so, the blend shape module 210 may employ one or more of a plurality of blend shapes 214 (block 306). Blend shapes 214 define distortions to a facial geometry as specific displacements of a sparse group of control points (or denser groups of vertices). The blend shapes 214, for instance, may define a set of caricature-specific blend shapes that enable extreme stylized distortions, while preserving identity. The blend shapes 214 are specifically developed with particular stylized distortion in mind, such that the corresponding results look visually pleasing.

The blend shape module 210 may then smoothly blend (i.e., morph) vertices of a current face model 208 in real time. To do so, each blend shape 214 is applied to the face model using a finite element technique. Using this technique, blend shapes 214 define positions that sparse control points are going to take, solely, and which control points are going to remain in the place. This way, the finite element technique may be used to move the remaining vertices of a face model to accommodate for the intended changes, in a smooth and visually pleasing way. In order to preserve the modifications before them, the finite element technique is applied after use of each blend shape 214.

Additionally, at least some of the blend shapes 214 include respective interaction rules 216 that define interaction of distortions of different facial features jointly with each other, thereby preserving an identity of a subject of the caricature. This may be performed automatically and without user intervention by a blend shape selection module 218 and/or manually through use of a user interface module 220.

In an automated example in which the blend shape selection module 218 automatically selects and applies the blend shapes 214 (block 308), the blend shape selection module employs a landmark detection module 602 to detect landmark values 604 of the facial features (block 310). The landmarks may correspond to or be different from the facial features 204 recognized by the feature detection module 202 used to generate the face model 208.

Landmark comparison data 608 is then generated by a reference comparison module 606 by comparing the landmark values 604 of the facial features to reference values 610 of the facial features (block 312). Reference values 610, for instance, may define a distance between eyes 702, eye size 704, nose length 706, nose size 708, mouth height 710, mouth width 712, forehead height 714, forehead width 716 jaw width 718, chin length 720, eye rotation 722, eyebrow angle 724, head size 726, lip size 738, teeth size 730, and other values of facial features and relationships of those features to each other.

In one example, comparison of the landmark values 604 to the reference values is performed by the landmark comparison module 606 to generate ratios, e.g., by dividing the landmark values 604 with respective reference values 610. These ratios are used to control a weight of the blend shape 214, which may be positive or negative depending on the specific features of the subject. An example of a fundamental reference for these ratios is the size of an eye of the subject, computed from the landmark values 604. In another example, fractions of a face height (e.g., from chine to forehead) are used instead of eye units.

Different distances are then computed (e.g., distance between eyes 702, nose length 706) in "eye-size" units, and ratios computed by dividing the normalized landmark values 604 with the reference values 610. The ratios control exaggerations to be made to the face model. For example, ratios larger than one indicate facial features that are to be made larger and ratios less than one indicate facial features that are to be made smaller. These ratios enable a proportional exaggeration of the facial features with a single global scale value. In an implementation the ratios are also normalized such that the biggest ratio for the most prominent feature has a ratio of one.

The landmark comparison data 608 is then received by a blend shape identification module 612 to select a blend shape 214 from a plurality of blend shapes automatically and without user intervention in this example. The blend shape identification module 612, for instance, may first rank the facial features based on how much the facial features deviate from the reference values. The blend shape identification module 612 may then select and apply the blend shapes 214, sequentially in succession, based on this ranking. This may be performed for facial features exhibiting at least a threshold amount of deviation, for a specified number of blend shapes 214 and/or corresponding facial features, and so forth.

As previously described, conventional techniques did not support interaction of distortions with each other and thus typically resulted in visually disturbing results in which the distortions visually "fought with" each other. Accordingly, in at least one example the blend shapes 214 include interaction rules 216 that defines an interplay of distortions that are jointly applied to at least two of the facial features to generate the distorted face model 212.

Illustrated examples of interactions includes a distance between eyes and nose length 802 such that an increase in nose length causes a distances between the eyes to be reduced and vice versa. In another example, an interaction rule 216 involves an interplay between nose size and eye size 804 such that an increase in nose size causes a corresponding decrease in eye size and vice versa.

Yet another interaction rule 216 involves an interplay of mouth height and chin length 806, in which, an increase in chin length causes a decrease in mouth height and vice versa. An interaction rule 216 may also specify a direct relationship between mouth width and jaw width 808. Another interaction rule 216 may also specify a direct relationship between eyebrow height with regards to a reference point 810, such that the higher the reference point is set, the higher the eyebrow height is pushed and vice versa.

A further example of an interaction rule 216 specifies that an increase in forehead width causes a corresponding decrease in jaw width 812. Likewise, an interaction rule 216 may also specify that an increase in forehead height causes a corresponding decrease in chin length 814. Eye rotation 816 and eyebrow angle 818 with respect to a leveled position may also be controlled via an interaction rule 216, which may be performed independently for each eye or eyebrow, respectively. Other rules are also specified as part of the blend shapes include head size 820, mouth size 822, and teeth size 824 such that different scaling factors may be applied independently for lips, teeth, and mouth size. Thus, as described above the blend shapes may specify interaction rules 216 defining inverse relationships between facial features (e.g., nose size and eye size 804) or direct relationships (e.g., mouth width and jaw width 808). Independent blend shapes 214 are also contemplated, examples of which include head size 820, mouth size 822, and teeth size 824. Other examples are also contemplated.

Thus, landmark comparison data 608 may be used by a blend shape identification module 612 to select blend shapes 614 (e.g., based on ranked deviations) (block 314) and apply those blend shapes 614 to generate the distorted face model 212. In one example, the amounts of deviation defined by the landmark comparison data 608 are used to specify respective values 616 that indicate an amount of distortions to be applied using respective bland shapes 214. An example of this may then be rendered for output in a user interface.

As illustrated in FIG. 9, for instance, a digital image caricature 118 generated automatically and without user intervention is then rendered by the caricature generation system 116. The user interface module 220 is then employed to output options 702 (e.g., sliders) in a user interface. These options are user selectable in this example to refine the automatically generated digital image caricature. Each of the options, for instance, may correspond to a respective blend shape 214 to adjust interplay of distortions with each other as part of the interaction rules 216 as described above, amount of "stand alone" blend shapes 214 (e.g., head size), and so forth.

In another example, the user interface module 220 is configured to initially output a rendered version of the face model 208, directly. User inputs are then received through user interaction with the options 702 via a user interface to then generate the distorted face model 212 that then serves as a basis to form the digital image caricature 118. For example, a user input is detected by the user interface module 220 that specifies a degree, to which, the distortions are jointly applied to the at least two facial features (block 316). The distortions may be generated and rendered in real time in a user interface by the user interface module 220, i.e., as the user inputs are received. Thus, the blend shape module 210 may support both automated and manual techniques through use of the blend shapes 214 and corresponding interaction rules 216.

Returning to FIG. 2, the distorted face model 212 is received as an input by a color generation module 222. The color generation module 222 is configured to color the distorted face model 212 using the digital image 106 (e.g., for photorealistic results), through application of texture data 224, and so forth. In this way, the distorted face model 212 is used to form the digital image caricature 118 for rendering by the digital image rendering module 226 (block 318), e.g., in real time. As shown in the example of FIG. 10, the input digital image 106 is warped by the color generation module 222 to form the digital image caricature 118 that looks photorealistic. Other examples are also contemplated, including texture data 224 to mimic chalks, paints, and other material properties as part of further processing through a stylization filter that may be implemented in a variety of ways, such as a neural network, patch-based texture synthesis, and so forth.

In another use case, a virtual character model is received by the blend shape module 210 having an associated collection of blend shapes 214. The virtual character model, for instance, may be configured to define an avatar or other entity as part of virtual character creation functionality. The interaction rules 216 are then employed by the blend shape module 210 using these already defined blend shapes to enforce the defined interactions. Thus, in this example the interaction rules 26 may be employed for pre-existing blend shapes 214. A variety of other examples are also contemplated.

In this way, the caricature generation system 116 may generate a digital image caricature 118 that overcomes the challenges of conventional systems and may do so in real time, which is not possible by a human user, alone.

Example System and Device

Figure 11:
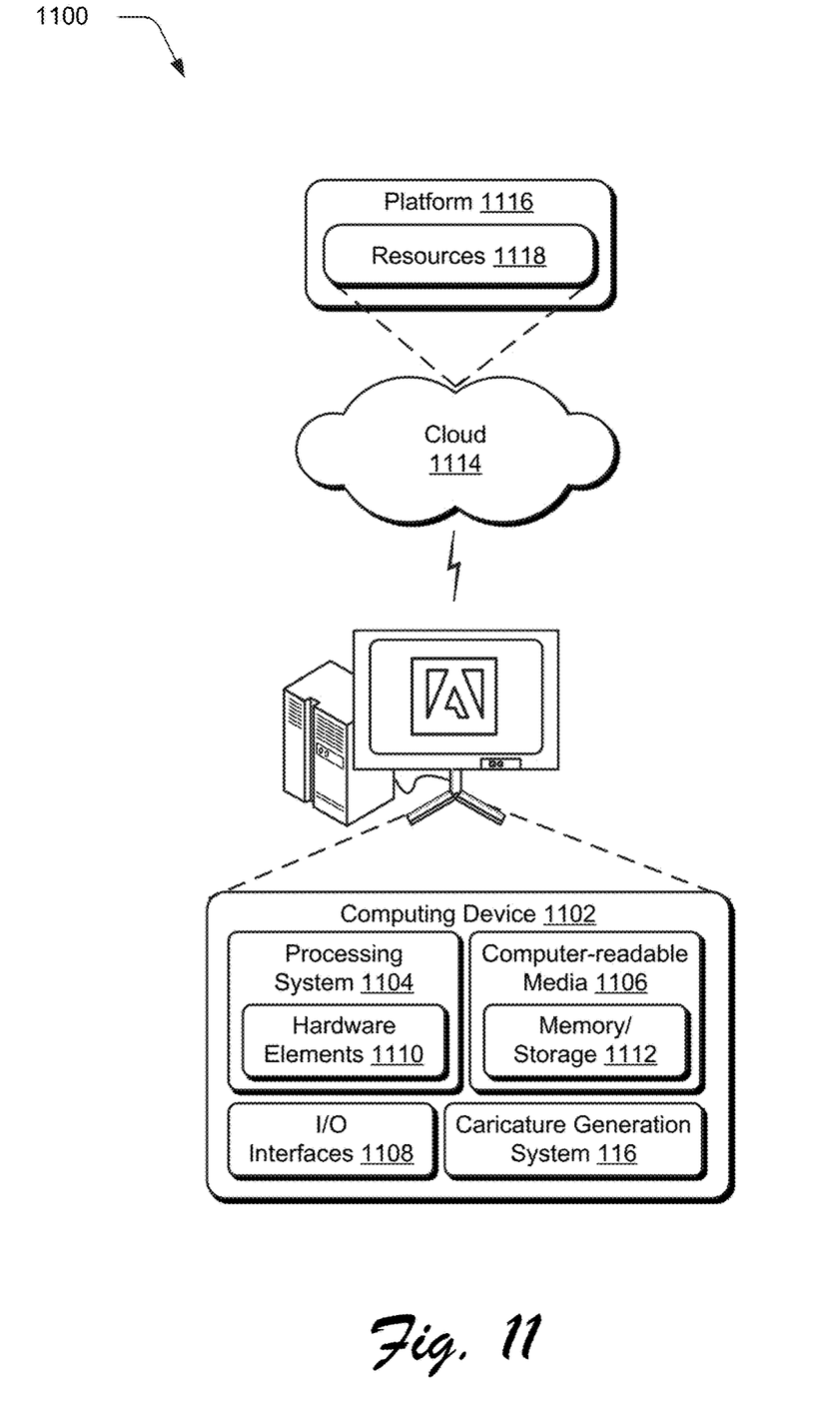
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that may implement the various techniques described herein. This is illustrated through inclusion of the caricature generation system 116. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium caricature creation environment, a method implemented by a computing device, the method comprising:
   detecting, by the computing device, landmark values of facial features in a digital image;
   generating, by the computing device, a face model based on the facial features;
   distorting, by the computing device, the face model based on a plurality of blend shapes applied sequentially to the face model using a ranking based on the detected facial features, the ranking based on how much the landmark values of the facial features deviate with respect to reference values of the facial features
   rendering, by the computing device, the distorted face model as a digital image caricature.

2. The method as described in claim 1, further comprising selecting, by the computing device, the plurality of blend shapes automatically and without user intervention.

3. The method as described in claim 2, wherein the ranking includes:
   detecting, by the computing device, landmark values of the facial features;
   generating, by the computing device, landmark comparison data by comparing the landmark values of the facial features to reference values of the facial features; and
   ranking, by the computing device, the plurality of blend shapes based on the landmark comparison data.

4. The method as described in claim 1, further comprising detecting a user input specifying a degree, to which, the distortions are to be jointly applied to at least two said facial features and wherein the distorting is based on the user input.

5. The method as described in claim 1, wherein the blend shape defines an offset to be applied as part of distortions to landmark values of the facial features.

6. The method as described in claim 1, wherein interplay of the distortions defines an inverse relationship of at least two said facial features, one to another, such that an increase in one of the at least two said facial features causes a decrease in another one of the at least two said facial features.

7. The method as described in claim 1, further comprising applying texture data to the face model and wherein the rendering of the face model includes the texture data.

8. The method as described in claim 1, wherein the face model is a three-dimensional face model or a two-dimensional face model.

9. In a digital medium caricature creation environment, a system comprising:
   a feature detection module implemented at least partially in hardware of a computing device to detect landmark values of facial features in a digital image;
   a model generation module implemented at least partially in hardware of the computing device to generate a face model based on the facial features;

a blend shape module implemented at least partially in hardware of the computing device to distort the face model based on a plurality of blend shapes, the plurality of blend shapes applied sequentially to the face model using a ranking, the ranking based on how much the landmark values deviate from reference values of the facial features; and a digital image rendering module implemented at least partially in hardware of the computing device to render the distorted face model as a digital image caricature.

10. The system as described in claim 9, further comprising a blend shape selection module to select the plurality of blend shapes automatically and without user intervention.

11. The system as described in claim 10, wherein the ranking includes:

generating landmark comparison data by comparing the landmark values of the facial features to the reference values of the facial features; and selecting, by the computing device, the plurality of blend shapes based on the landmark comparison data.

12. The system as described in claim 9, further comprising a user interface module configured to detect a user input specifying a degree, to which, distortions are jointly applied to at least two said facial features of the digital image.

13. The system as described in claim 9, wherein the plurality of blend shapes define an offset, respectively to be applied as part of distortions to the landmark values of the facial features.

14. The system as described in claim 9, wherein an interplay of distortions corresponding to at least two said facial features defines an inverse relationship of the at least two facial features, one to another.

15. The system as described in claim 9, further comprising a color generation module configured to apply texture data to the face model and wherein the rendering of the face model by the digital image rendering module utilizes the texture data.

16. The system as described in claim 9, wherein the face model is a three-dimensional face model.

17. In a digital medium caricature creation environment, a system comprising:

means for detecting facial features in a digital image;

means for generating a face model based on the facial features;

means for selecting a blend shape from a plurality of blend shapes, the selection based on respective ratios of landmarks values of the facial features to reference values of the facial features;

means for distorting the face model based on the blend shape; and means for rendering the distorted face model as a digital image caricature.

18. The system as described in claim 17, wherein the selecting means includes means for selecting the blend shape automatically and without user intervention.

19. The system as described in claim 17, further comprising means for detecting a user input specifying a degree, to which, the distortions that are jointly applied as having an inverse relationship to at least two said facial features of the digital image and wherein the distorting means is configured to distort the face model based on the user input.

* * * * *

UNITED STATES PATENT AND TRADEMARK OFFICE
CERTIFICATE OF CORRECTION

PATENT NO. : 10,559,116 B2
APPLICATION NO. : 15/912324
DATED : February 11, 2020
INVENTOR(S) : Jose Ignacio Echevarria Vallespi Page 1 of 1

It is certified that error appears in the above-identified patent and that said Letters Patent is hereby corrected as shown below:

In the Claims

Column 12, Line 25, after "features", insert -- ; and --, therefor.

Signed and Sealed this
Thirty-first Day of March, 2020

Andrei Iancu
*Director of the United States Patent and Trademark Office*